United States Patent [19]
Cicatelli

[11] 4,180,836
[45] Dec. 25, 1979

[54] POSITIONING DEVICE OF PLAY-BACK HEADS AND PRESSING DEVICES IN PLAY-BACK AND/OR RECORDING APPARATUS

[75] Inventor: Rodolfo Cicatelli, Gandria, Switzerland

[73] Assignee: Motorola, Inc., Schaumburg, Ill.

[21] Appl. No.: 910,324

[22] Filed: May 30, 1978

Related U.S. Application Data

[63] Continuation of Ser. No. 720,400, Sep. 3, 1976, abandoned.

[51] Int. Cl.² .............................................. G11B 15/29
[52] U.S. Cl. ................................ 360/130.32; 360/105
[58] Field of Search ............... 360/130, 105, 104, 109, 360/129, 96, 93

[56] References Cited

U.S. PATENT DOCUMENTS

| 3,635,423 | 1/1972 | Lennie | 360/96 X |
|---|---|---|---|
| 3,686,433 | 8/1972 | Camras | 360/130 X |
| 3,810,237 | 5/1974 | Nozawa | 360/105 |
| 3,903,544 | 9/1975 | Nakamichi | 360/130 X |
| 4,071,861 | 1/1978 | Hirose | 360/96 |

*Primary Examiner*—John H. Wolff
*Attorney, Agent, or Firm*—James W. Gillman; Phillip H. Melamed

[57] ABSTRACT

The present invention provides a play-back and/or recording apparatus which has an improved positioning device for determining a working position of play-back heads and pressing devices (pressure rollers). The positioning device comprises a rigid support which rigidly carries at least one play-back head and one pressing device. The rigid support, along with elements rigidly attached to it, is moved into a working position in the apparatus by forming three points of contact with block elements fixed with respect to the frame of the apparatus. These three points of contact form an imaginary triangular configuration and insure the accurate positioning of the play-back head and pressing device while resulting in a simplified positioning device.

7 Claims, 3 Drawing Figures

POSITIONING DEVICE OF PLAY-BACK HEADS AND PRESSING DEVICES IN PLAY-BACK AND/OR RECORDING APPARATUS

This is a continuation, of application Ser. No. 720,400, filed Sept. 3, 1976 now abandoned.

BACKGROUND OF THE PRESENT INVENTION

It is well known that in play-back and/or recording apparatus, the band (tape) is unwound from a reel while it is wound on another reel and it runs in front of one or more reading (play-back) and/or recording heads while passing between a capstan and a pressing device (pressure roller).

It is also known that both the play-back heads and pressing devices must be reciprocably moveable with respect to antagonistic elements, i.e., block elements which can include the capstan, for the purpose of accurately positioning the pressing devices and play-back heads for allowing normal progress of the band as well as fast forward and fast return progress of the band.

According to the prior art, the problem of accurate positioning is solved by mounting the play-back heads, and/or pressing devices, on rotating arms or slides. These rotating arms and slides are driven against block elements which are firmly connected to the frame of the play-back and/or recording apparatus to position the play-back heads while positioning the pressing devices against the capstans. Generally, the arms and slides are subjected to an elastic driving force and these arms and slides are usually part of a complicated positioning apparatus required in order to accurately position the pressing devices and play-back heads.

SUMMARY OF THE INVENTION

The present invention essentially comprises rigidly attaching the play-back heads and pressing elements to a rigid support which is moveable relative to block elements that are fixed with respect to the frame of a play-back and/or recording apparatus such that a working position of said support and heads and pressing elements is determined by an imaginary triangular configuration of three points of contact with the block elements. The triangular configuration is accomplished by the use of a flexible joint located within the triangular configuration which allows the achievement of three points of contact to accurately position the support, heads and pressing devices with respect to the frame. The three point support configuration positions the play-back head and pressing devices in a working position with respect to the band and frame, and automatically compensates for any inaccuracies in the construction and assembly of the aforementioned components. Preferably, one of the points of contact is between the pressing device and the capstan.

BRIEF DESCRIPTION OF THE DRAWINGS

The invention is shown, by way of example only, in the drawings, in which.

DESCRIPTION OF THE PREFERRED EMBODIMENT

Figure 1:
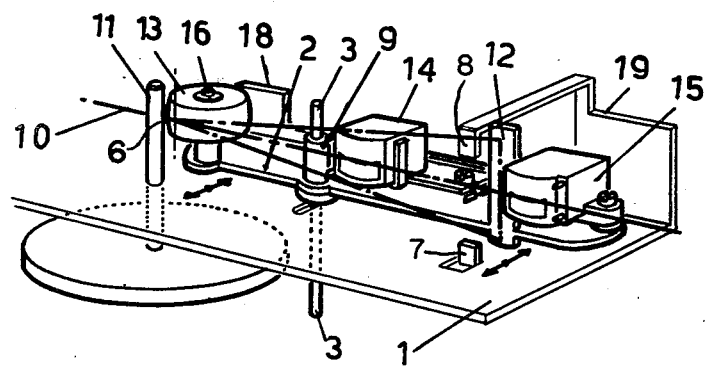
FIG. 1 represents a perspective diagrammatical view of the device embodying invention.
Figure 2:
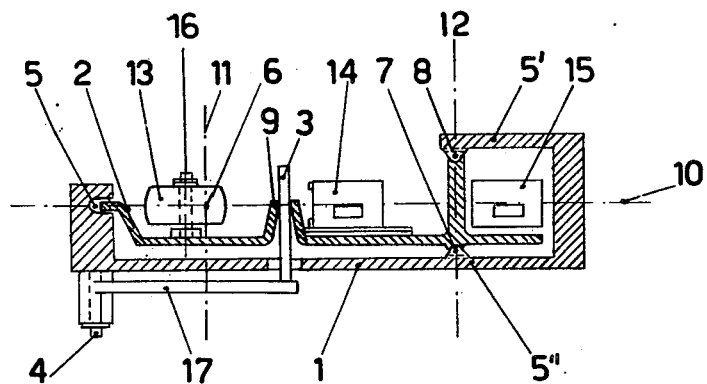
FIG. 2 represents a sectional view of the device shown in FIG. 1.

With reference to the attached drawings, and in particular to FIGS. 1 and 2, a play-back head 14 and/or a recording head 15, in addition to a pressing device (pressure roller) 13 of the band, are rigidly carried by and affixed to a rigid support 2 that is movable with respect to a frame 1 of a play-back and/or recording apparatus. The support 2 has a working position for it determined by three points of contact 6, 7 and 8 that represent the positions of block elements which are fixed with respect to the frame 1 and which form the vertices of an imaginary triangle laying roughly in a plane parallel to the plane of the band (tape). Positioning the support 2, and the components carried thereby, in a working position determined by the three vertices 6, 7 and 8 is accomplished through a collar link 9 attached to the support 2 and controlled in turn by a pivot 3 that preferably represents the button projection of an equalizer 17 mounted on a pivot 4 of the frame 1.

One of said vertices of the imaginary triangle formed by the points of contact is the point 6 of contact between the pressing device 13 and a capstan 11 which is fixed with respect to the frame 1 and forms a block element. The other two vertices 7 and 8 are aligned following a line on a vertical member 12 of the support 2, wherein the line is preferably orthogonal to an axis of movement 10 of the band (tape) in the plane of movement of the band. The vertex 8 is above the axis 10 and corresponds to a block element projection that is also rigidly attached to the frame 1. The vertex 7 is below the axis 10 and corresponds to a block element projection that is also rigidly positioned with respect to the frame 1. The vertices 7 and 8 are aligned such that they define a hinge axis corresponding to the line on the vertical member 12 around which the support 2 can rotate until the pressing device 13 reaches its contact point 6 against the capstan 11. In such a way, the support 2 can be accurately elastically loaded into a predetermined working position which is determined by the three points of contact 6, 7 and 8.

From the drawings and the specification it can be seen that the support 2 and the elements carried by it are movable towards and away from the position of the band (tape) by way of the pivot pin 3 working freely in all directions within the collar 9 located inside the imaginary triangular support configuration having the vertices 6, 7 and 8. Preferably, the collar 9, which has a conical shape as shown in FIG. 2, is located on the axis 10 of the band (tape) in such a way that the support 2 can be freely shifted in all directions into its working position determined by the three points of contact.

As already pointed out, the pivot 3 is the button projection of an equalizer 17 having its fulcrum at the pivot 4 of the frame 1. The equalizer 17 is elastically moved by way of a spring (not shown) to move the support 2 into its working position such that the pressing element 13 contacts the capstan 11 at the point 6 and that the ends of the vertical member 12 contact block elements, coupled to the frame 1, at points 7 and 8. Conventionally, tqe support 2 is moved within guideways 5, 5' and 5" which are formed on the frame 1, these guideways generally roughly determining the vertical positioning of the support 2 (see FIG. 2).

As a consequence of the aforesaid construction, the play-back head 14 and the head 15 will be located in substantially proper positions with respect to the band despite any misalignment between a pin 16 on which the pressing device 13 is pivotally positioned and the axis of the capstan 11. This is because the three points of contact 6, 7 and 8 are used to position the support 2 in its working position which therefore also positons the heads 14 and 15 along with the pressing device 13. In positioning elements 13, 14 and 15, the collar 9 and pivot 3 permit movement of the support 2 in all directions to insure three points of contact. The collar 9 provides this freedom of movement for the support 2 because of its tapered conical shape which is illustrated specifically in FIG. 2. The contact 6 between the capstan 11 and the pressing device 13 is one of the three points of contact that determine the working position of the support 2 and this point of contact will always exist when the support 2 is moved towards the band and into its working position. Inaccuracies in the construction of the support 2 and various other members are taken up due to the providing of a conical shaped collar 9 which permits the support 2 to rotate in all directions until three points of contact are established with block elements for positioning the support 2.

It is also possible, without changing the triangular support configuration or the construction of the collar joint 9 located within the triangular configuration, to provide an additional freely movable joint between the mounting pin 16 of the pressing device 13 and the support 2.

It should be pointed out that to remove the support 2 which carries the pressing device 13 and the heads 14 and 15 over two back ledges 18 and 19, the support 2 should be lifted and moved such that it is parallel to the plane of the band.

Figure 3:
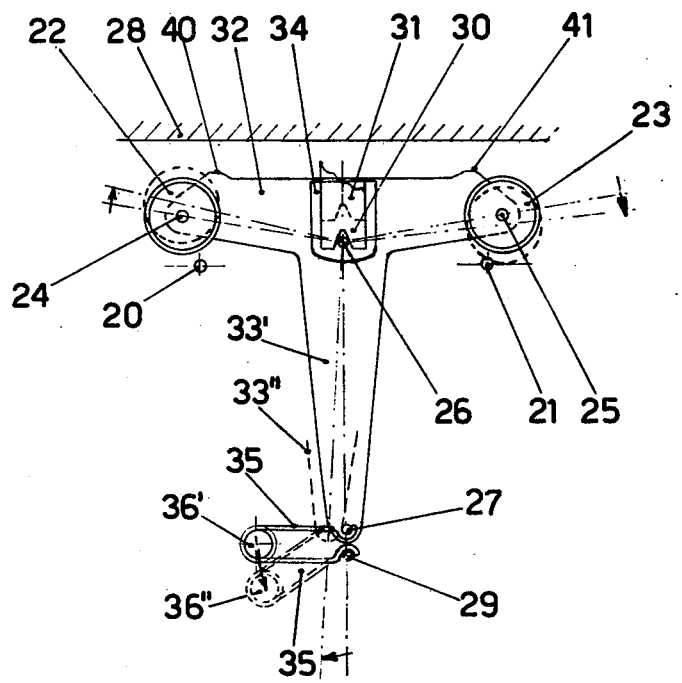
FIG. 3 shows a variation (an additional embodiment) of the present invention, the variation being usable in a playback and/or recording apparatus which allows play-back in both directions of running of the band and which uses two pressing devices.

The present invention can also be applied to play-back and/or recording apparatus which is capable of reading a band in either of two running directions. FIG. 3 illustrates, by way of example, applying the present invention to such an apparatus. The reference numbers 20 and 21 represent two separate capstan connected respectively with pressing devices 22 and 23 carried by mounting posts 24 and 25. A hinge axis 26 corresponds to the hinge axis formed by the block elements 7 and 8 shown in FIGS. 1 and 2 anc coincides with the center line of a play-back head 34, and a support 32, corresponding to the support 2 in FIGS. 1 and 2, swings relative to the axis 26 between two positions in which either the pressing device 22 contacts the capstan 20 or the pressing device 23 contacts the capstan 21. Two imaginary support configurations are formed by this structure, each having the hinge axis 26 in common and one containing the contact point between capstan 21 and pressing device 23 while the other containing the contact point between capstan 20 and pressing device 22.

The support 32 is generally T-shaped and carries upon each end of its crossbar one of the mounting posts 24 and 25 of the pressing devices 22 and 23, respectively. The support 32 has a central appendage 33 as the vertical arm of the T-shaped structure and a pivot pin 27 is mounted on an end of this central appendage. A two position spring 35 is supported on one end by the pivot pin 27 and supported on another end by a pivot pin 29 carried by a frame 28. The spring 35 provides two stable positions for the support 32, one of which is shown dashed in FIG. 3 as position 33″. The position 33′, shown solid in FIG. 3, is a position of unstable equalibrium for the support 32, and the position 33″ represents one of two stable working positions for the support 32. Essentially, the support 32 will swing about the axis 26, which is centered with respect to the play-back head 34, with the points of contact between the pressing devices 22 and 23 and the capstans 20 and 21 determining the extent of the swinging motion of the support 32.

Projections 40 and 41 of the support 32 are used to determine the resting or non-working position of the swinging support 32 by coming in contact with ledges of the frame 28.

One advantage of the present invention is a great reduction in the number of pieces used to accurately position the pressing devices and play-back heads in a play-back and/or recording apparatus. In addition, the use of the present invention will result in simplifying the assembling and disassembling of such a positioning device while reducing its size. Preferably, the present invention is contemplated as being used for play-back and/or recording apparatus for automobile or portable cassette players in which size and ease of assembly is of paramount importance.

I claim:

1. A device for positioning play-back heads and pressing devices (pressure rollers) in a band (tape) play-back and/or recording apparatus having a frame, said device comprising:

at least one play-back head and at least one pressure roller affixed on a rigid support which is movable into a working (play) position with respect to said frame, wherein said pressure roller contacts a capstan shaft with tape being driven therebetween in said working position;

said support being movable relative to first block elements which are fixed with respect to said frame, said first block elements determining the working position for said support carrying said play-back head and said pressure roller by forming three points of contact with second elements that are rigidly affixed to said support, said contact points corresponding to the vertices of a triangular configuration, two of said three points of contact effectively forming a hinge axis for said support about which said support can rotate as it is moved into its working position;

a pin which is located between said two vertices forming said hinge axis and the third vertex, said pin being coupled to and movable with said support and permitting free movement of said support about said pin; and means coupled to said pin for moving said pin and said support into said working position in a trajectory substantially orthogonal to the plane of movement of the band (tape).

2. A device according to claim 1 wherein said pin is coupled to a joint (collar) on said support, and wherein said collar has a conical shape surrounding said pin.

3. A device according to claim 2 wherein said pressure roller comprises one of said second elements which are rigidly fixed to said movable support, said pressure roller having a central rotational axis pin rigidly fixed to said movable support with said pressure roller being rotatable about said fixed central axis pin, and wherein said third vertex corresponds to the point of contact between said capstan shaft and said pressure roller, and said two vertices forming said hinge axis are located along a line substantially orthogonal to the axis of tape movement, one of these two vertices being above the axis of tape movement and one being below.

4. A device according to claim 3 wherein said second block elements forming said hinge axis include at least an integral portion of said movable support, and wherein said first elements fixed with respect to said frame include said capstan shaft and at least an integral portion of said frame.

5. A device according to claim 4 in which the movement of said rigid support is guided by guideways formed in said frame, said guideways substantially determining the vertical positioning of said movable support with respect to said frame.

6. A device according to claim 1 wherein said pressure roller comprises one of said second elements which are rigidly fixed to said movable support, said pressure roller having a central rotational axis pin rigidly fixed to said movable support with said pressure roller being rotatable about said fixed central axis pin, and wherein said third vertex corresponds to the point of contact between said capstan shaft and said pressure roller, and said two vertices forming said hinge axis are located along a line substantially orthogonal to the axis of tape movement, one of these two vertices being above the axis of tape movement and one being below.

7. A device according to claim 6 wherein said second block elements forming said hinge axis include at least an integral portion of said movable support, and wherein said first elements fixed with respect to said frame include said capstan shaft and at least an integral portion of said frame.

* * * * *

UNITED STATES PATENT AND TRADEMARK OFFICE
CERTIFICATE OF CORRECTION

PATENT NO. : 4,180,836
DATED : December 25, 1979
INVENTOR(S) : Rodolfo Cicatelli It is certified that error appears in the above-identified patent and that said Letters Patent are hereby corrected as shown below:

After item [63] identifying related U.S. application data on the cover page of the patent, please insert:

--[30] Foreign Application Priority Data
September 10, 1975, Italy ... 51284A/75--

After the colon following the word "Assignee" in item [73] on the cover page of the patent:

Please delete "Motorola, Inc., Schaumburg, Illinois" and insert --Autovox S.p.A., Rome, Italy--

Signed and Sealed this

Fifteenth Day of April 1980

[SEAL]

Attest:

SIDNEY A. DIAMOND

Attesting Officer

Commissioner of Patents and Trademarks